US00RE36164E

United States Patent [19]

Johnson et al.

[11] E Patent Number: Re. 36,164

[45] Reissued Date of Patent: Mar. 23, 1999

[54] CONVOLUTED BOLT RETAINER

[75] Inventors: H. Thad Johnson, 9002 Hidden Trail, Davisburg, Mich. 48350; Leon L. Mesler, Flushing, Mich.

[73] Assignee: H. Thad Johnson, Flint, Mich.

[21] Appl. No.: 812,866

[22] Filed: Mar. 6, 1997

Related U.S. Patent Documents

Reissue of:

[64] Patent No.: 5,395,194
Issued: Mar. 7, 1995
Appl. No.: 135,748
Filed: Oct. 13, 1993

[51] Int. Cl.[6] ..... F16B 21/00; F16B 21/18

[52] U.S. Cl. ..... 411/353; 411/512; 411/970; 411/999; 29/525.11

[58] Field of Search ..... 411/55, 60, 61, 411/171, 352, 353, 441, 512, 970, 999; 29/525.02, 525.04, 525.11, 525.12

[56] References Cited

U.S. PATENT DOCUMENTS

| | | | |
|---|---|---|---|
| 1,572,770 | 2/1926 | Colley | 411/353 |
| 2,374,743 | 5/1945 | Granville . | |
| 2,931,412 | 4/1960 | Wing | 411/999 X |
| 3,008,368 | 11/1961 | Hammitt et al. . | |
| 3,083,796 | 4/1963 | Bell, Jr. . | |
| 3,090,203 | 5/1963 | Durget . | |
| 3,137,195 | 6/1964 | Rosenberg et al. | 411/441 |
| 3,217,774 | 11/1965 | Peochino | 411/353 |
| 3,221,847 | 12/1965 | Attwood . | |
| 3,262,480 | 7/1966 | Storch . | |
| 3,447,229 | 6/1969 | Clark . | |
| 3,452,636 | 7/1969 | Cohen et al. . | |
| 4,309,123 | 1/1982 | Moore . | |
| 4,334,599 | 6/1982 | Ritsema et al. . | |
| 4,435,112 | 3/1984 | Becker . | |
| 4,607,992 | 8/1986 | Mauritz et al. . | |
| 4,971,497 | 11/1990 | Stoffer et al. . | |
| 4,979,858 | 12/1990 | Van Allman et al. | 411/441 |
| 5,141,357 | 8/1992 | Sherman et al. . | |
| 5,209,620 | 5/1993 | Zare-Ardestani . | |

FOREIGN PATENT DOCUMENTS

| | | | |
|---|---|---|---|
| 3706616 | 9/1988 | Germany | 411/60 |
| 855297 | 11/1960 | United Kingdom | 411/60 |
| 929149 | 6/1963 | United Kingdom | 411/171 |

*Primary Examiner*—Neill R. Wilson
*Attorney, Agent, or Firm*—Harness, Dickey & Pierce, P.L.C.

[57] ABSTRACT

A retaining apparatus disposable within an axial bore for maintaining a fastener having an extending shank within a bore provided on a structural member. In the preferred embodiment, the retainer comprises a convoluted, polymeric, thin-walled annular body constructed of a resilient material with an aperture extending therethrough. The unitary body is defined by longitudinally extending radially outwardly projecting ear portions and radially inwardly projecting ribs which circumferentially alternate in a symmetrical pattern. A method for pre-attaching fasteners to structural members includes disposing the retainer within a bore contained on a structural member and subsequently inserting the fastener through the retainer's aperture. The fastener is thereby flexibly maintained along the central axis of the bore. The structural member may then be transported with fasteners pre-attached for subsequent attachment to another structural member. The fasteners may be shifted and/or tilted, as necessary, within the first bores in order to align the fastener shanks with the corresponding bores contained on the second structural member which may or may not be in axial alignment with the bores of the first structural member.

12 Claims, 2 Drawing Sheets

CONVOLUTED BOLT RETAINER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to fastener retainers and, more particularly, to a convoluted fastener retainer for maintaining a fastener having an extending shank within a bore provided on a structural member.

2. Discussion

Manufacturers are constantly striving to increase productivity by reducing assembly time during the manufacturing process. It is known in the art to streamline manufacturing by pre-attaching fasteners to structural members which are later used in the assembly of a component.

U.S. Pat. No. 3,083,796, which issued on Apr. 2, 1959 to Bell, discloses a rigid annular sleeve including inwardly extending fingers which is disposable over a fastener shank. The fastener is inserted through a bore contained on a bracket and the sleeve is then disposed over the fastener shank whereby the inwardly extending fingers engage the fastener threads and fixedly hold the sleeve relative to the fastener. The fastener is thereby secured on the bracket by the annular sleeve and subsequently applied to second member through a threaded opening. The sleeve must be interposed between the two members, however, to maintain them in spaced relation, and therefore the annular sleeve is not suitable for use in most manufacturing applications. Thus, a bolt retainer operable within a conventional bore is still needed.

Assembly times may also be improved by providing a means to more easily align the fastener with a corresponding bore on a second component which may or many not be in axial alignment with the central axis of the first bore. U.S. Pat. No. 3,008,368, which issued Nov. 14, 1961 to Hammitt et al., discloses an annular sleeve slidably inserted over a fastener shank whereby, upon tightening the fastener, the exterior surface of the aligning device engages the wall of the bore extending through the first surface. A lateral force is thus produced which tends to push the first surface away from the fastener at the point of contact thereby aligning the bores.

Additionally, U.S. Pat. No. 5,141,357, which issued Aug. 25, 1992 to Sherman et al., discloses a similar apparatus designed to align fasteners within tapered bores. A cone shaped outer body having an eccentric cone shaped aperture extending therethrough is disposed within a tapered bore. A cone shaped inner body having an eccentric cylindrical bore is then positioned within the tapered inner bore of the outer body. By rotatably adjusting the outer and inner bodies relative to one another, the cylindrical bore is aligned with a bore on a second surface.

Neither Hammitt nor Sherman, however, provide a device disposable within an axial bore which allows the fastener to be simultaneously tilted and laterally shifted within the bore in order to achieve alignment with a bore on a second member. Sherman is disposable within a bore, but does not permit the fastener to tilt away from the central axis of the first bore. Conversely, Hammitt permits the fastener to be inserted into a nonparallel second bore but must be disposed on the fastener shank prior to fastener insertion.

Accordingly, it would be desirable to provide a retainer which both maintains pre-attached fasteners within a bore and permits the fastener to shift within the bore in order to achieve alignment with a second bore. The retainer must be disposable within a bore and capable of maintaining the fastener along the central axis of the bore in the absence of external forces. Additionally, the retainer must yield to selective translational and/or rotational movement of the fastener shank within the axial bore. Thus, the primary object of the present invention is to provide such a retainer which will further increase manufacturing productivity.

SUMMARY OF THE INVENTION

In accordance with the present invention, a retaining apparatus is disposed within a bore having a central axis and a diameter larger than the diameter of a fastener shank. The retainer comprises a substantially annular body having an aperture therethrough including means for resiliently receiving the fastener and thereafter flexibly maintaining the fastener within the bore. The resilient means permit selective movement of the fastener shank within the axial bore whereby the fastener shank may be aligned with a non-coincident corresponding bore contained on a second structural member by application of an external force to the fastener head.

In the preferred embodiment, the retainer is comprised of a convoluted annular body made of a polymeric material and having an aperture extending therethrough. The annular body is defined in part by a plurality of longitudinally extending radially outwardly projecting resilient ear portions. The outermost portions of the ear portions define an outer diameter slightly larger than the bore into which the retainer is to be disposed. The unitary body is furthermore defined by a plurality of longitudinally extending radially inwardly projecting rib portions. The innermost points of the ribs define an inner diameter which is slightly smaller than the diameter of the fastener shank to be retained. The ear portions and ribs are alternately and symmetrically disposed about the annular body and have sufficient circumferential spacing to permit lateral movement of the fastener shank within the axial bore.

The retainer is manually or robotically inserted into the bore whereby the ear portions become deformed. In response to the deformation, the ear portions produce static forces on the bore wall tending to frictionally maintain the retainer within the bore. The fastener is then inserted manually or with a fastening tool into the aperture of the retainer whereby at least a plurality of the resilient ribs become deformed. The ribs thus produce static forces on the fastener shank. The ear portions and ribs thus cooperate to maintain the fastener along the central axis of the bore.

The retainer has a longitudinal length, two distinct wall thicknesses, and material stiffness sufficient to successfully maintain the fastener along the central bore axis absent opposing external forces. The fastener retainer thus makes it possible to ship or otherwise transport the structural member with the fasteners pre-attached to carry out later occurring manufacturing operations more efficiently.

Upon alignment of a first structural member having retained fasteners with a second structural member containing corresponding bores, the fastener shanks may be shifted within the bores of the first structural member if necessary to align the shanks with the axes of non-aligned corresponding bores. An appropriate fastening tool is used to provide any necessary lateral forces to align the fastener with the bore in the second structural member as the fastener is advanced.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT

The following description of the preferred embodiment is intended to be exemplary in nature and is not intended to limit the invention, its application or uses.

Figure 1:
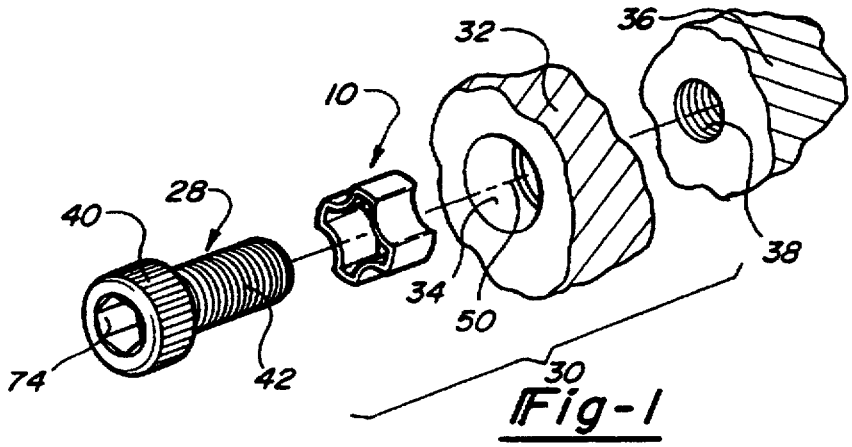
FIG. 1 is an exploded perspective view of an assembly including a fastener having an extending shank, a resilient retainer made in accordance with the teachings of his invention, a first structural member having a stepped bore for receiving the retainer and a second structural member containing a corresponding bore for receiving the distal portion of the fastener's shank.
Figure 2:
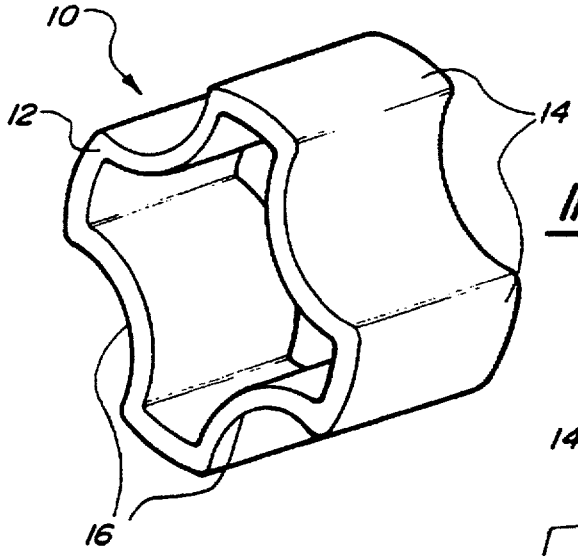
FIG. 2 is a perspective view of the resilient retainer illustrated in FIG. 1.
Figure 3:
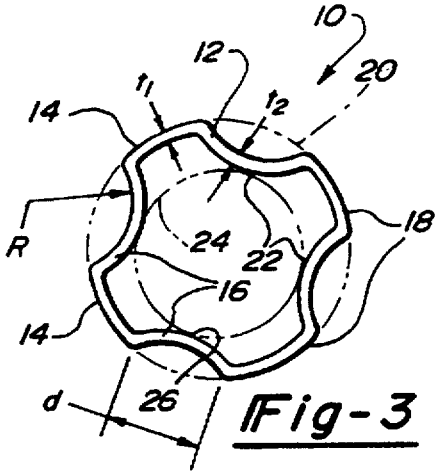
FIG. 3 is an end view of the retainer illustrated in FIGS. 1 and 2.

Referring to FIGS. 1, 2 and 3, a convoluted resilient fastener retainer 10 is demonstrated as having a convoluted, thin-walled annular body 12 having varying wall thicknesses made of a polymeric material and defined by a plurality of longitudinally extending radially outwardly projecting arcuate ear portions 14 and a plurality of longitudinally extending radially inwardly projecting substantially concaved arcuate ribs 16. The ribs 16 and ear portions 14 are alternately and symmetrically disposed about the annular body 12 and have sufficient circumferential spacing to permit lateral movement of the retained fastener shank within the bore 34, as discussed below. The ear portions 14 include outermost points 18 which seat substantially contiguously against the inner wall of the bore 34 and define an outer diameter shown by the dot and dash lines at reference numeral 20. The ribs 16, which occur between the ear portions 14, include innermost points 22 which define an inner diameter shown by dot and dash lines at reference numeral 24. Extending through the retainer 10 is an aperture 26.

The convoluted annular body 12 has dimensions and material stiffness sufficient to successfully perform the operations described below. Those skilled in the art will recognize that the dimensions will vary depending on bore and fastener size. For exemplary purposes, the retainer 10 of FIG. 3 is described as having a longitudinal length l of 6 mm, an ear portion wall thickness $t_1$ of 0.76 mm, a rib portion wall thickness $t_2$ of 0.50 mm, an outer diameter 20 of 11.20 mm, an inner diameter 24 of 7.44 mm, a rib portion radius of curvature R of 3.24 mm, and a tangential distance between ear portions d of 4.50 mm. It is intended that these dimensions be scaled appropriately for the desired application.

The annular body 12 is constructed of injection molded low density polyethylene. Various other manufacturing methods may be used, but injection molding is preferable due to its capacity to preserve dimensional tolerances during production.

Referring specifically to FIG. 1 there is shown an exploded view of an assembly 30 including the fastener retainer 10, a first structural member 32, which is representative of an engine cover plate or other such structure, having a stepped bore 34 extending therethrough, a second structural member 36, which is representative of an engine block or other such structure, including a corresponding bore 38 extending at least partially therethrough and a fastener 28 including a head portion 40 and an extending shank 42. While it should be understood by those skilled in the art that the first and second structural members 32 and 36, respectively, preferably include a plurality of bores, for exemplary purposes the assembly 30 will be described with reference to a single stepped bore 34 and a single corresponding bore 38. The stepped bore 34 includes an enlarged bore portion 44 extending from a surface 64 of the first structural member 32 and a reduced bore portion 46. The enlarged bore portion 44, into which the retainer 10 is to be disposed, has a diameter smaller than the outer diameter of the retainer 20. Separating the enlarged bore portion 44 and reduced bore portion 46 is a transversely disposed step 48.

Figure 5:
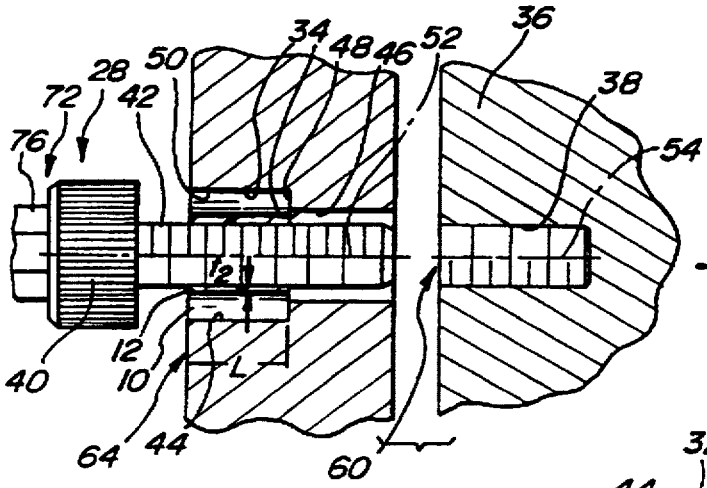
FIG. 5 is a partial cross-sectional view of an assembly including first and second structural members wherein the retainer has allowed repositioning of the shank of the fastener into an axially aligned position thus allowing the shank to be inserted into a corresponding bore contained on the second structural member.
Figure 6:
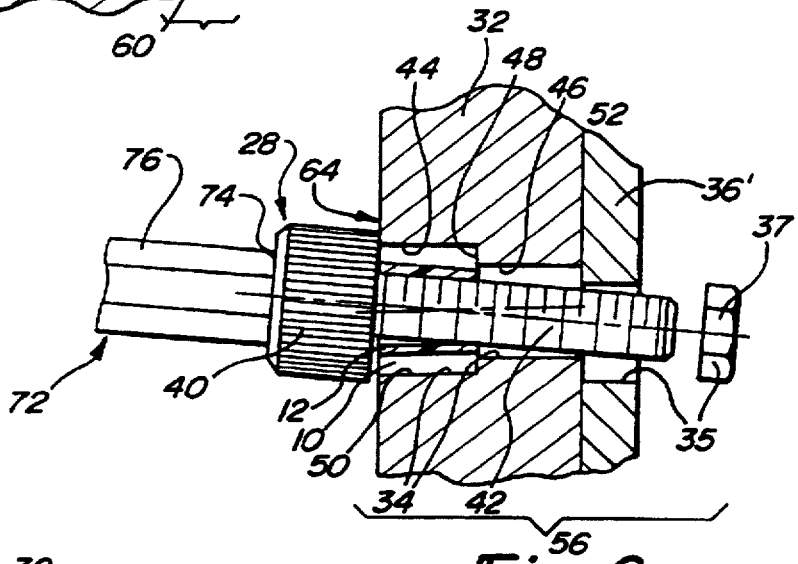
FIG. 6 is a partial cross-sectional view of the assembly wherein the fastener extends off-axis through the stepped bore into a hole in a second structural member.
Figure 7:
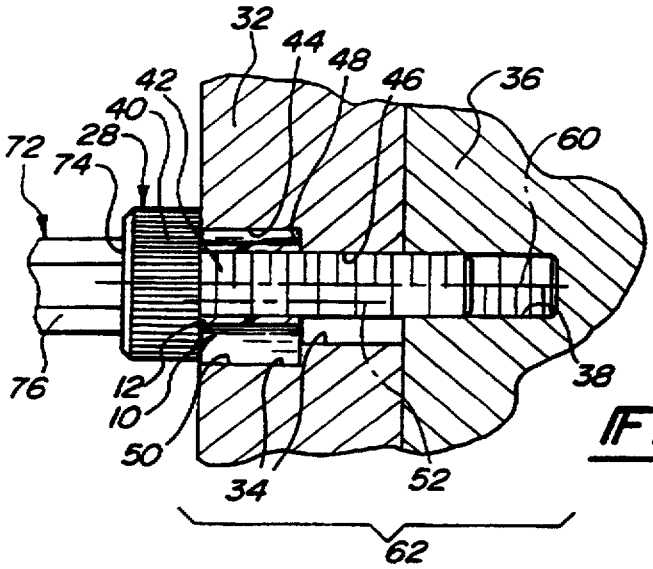
FIG. 7 is a partial cross-sectional view of an assembly wherein the fastener shank extends through the retainer along the central axis of a corresponding bore contained on the second structural member which is parallel to, but not coincident with, the central axis of the stepped bore.

The second structural member 36 includes a corresponding bore 38 for receiving the distal portion of the fastener shank 42. Although the configuration of the corresponding bore 38 will vary depending on fastener type, for exemplary purposes it is shown as a threaded bore. While the corresponding threaded bore 38 is shown in FIGS. 5 and 7 as extending partially through the second structural member 36 the invention may also be used when a hole 35 extends through the second structural member to allow for attachment of a coupling such as an internally threaded nut 37 as shown in FIG. 6.

The fastener 28 as noted generally includes a head portion 40 and an elongated shank 42 extending therefrom. The head portion 40 preferably is larger in diameter than the enlarged bore portion 44 so that the head can seat against the surface 64 when the fastener 28 is fully tightened. The head 40 for exemplary purposes is shown as including a hexagonal socket 74, although those skilled in the art will recognize that sockets of various configurations may be readily adapted to the present invention. The shank 42 is larger in diameter than the retainer inner diameter 24. The fastener shank 42 typically includes external threads which matably engage the internal threads of the corresponding bore 38.

The operational aspects of the present invention will now be described in greater detail. Initially, the retainer 10 is manually or robotically inserted into the enlarged bore portion 44 until the retainer 10 comes to rest on the step 48. Upon inserting the retainer 10 within the enlarged bore portion 44, at least a plurality of the ear portions 14 engage the annular wall 50 of the enlarged bore portion 44. Since the retainer outer diameter 20 is larger than that of the enlarged bore 44, the ear portions 14 elastically deform and exert a static force on the annular wall 50 which frictionally maintains the retainer 10 within the enlarged bore portion 44 in the absence of opposing external forces.

Figure 4:
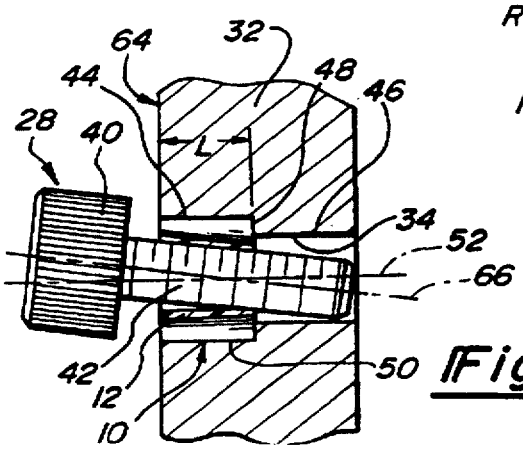
FIG. 4 is a partial cross-sectional view of a first structural member having a stepped bore extending therethrough, the resilient retainer disposed within the stepped bore and a fastener having an extending shank inserted through the retainer off-axis from the central axis of the stepped bore.

The shank 42 of the fastener 28 is then inserted through the aperture 26 of the retainer 10 by hand or with a fastening tool 72 (See FIGS. 5–7) having a head 76 which mates with the socket 74 of the fastener 28. It will be understood by those skilled in the art that other means for fastener insertion, such as a robot, are adaptable for use with the present invention. By virtue of the resiliency of the rib portions 16, the fastener may be inserted off the bore's central axis 52, as shown in FIG. 4. Since the diameter of the fastener shank 42 is larger than that of the retainer 10, the shank 42 upon insertion engages at least a plurality of the radially inwardly extending ribs 16. The ribs elastically deform and produce static forces on the fastener shank 42. Thus, the ear portions 14 and ribs 16 cooperate to maintain the fastener shank 42 along the central axis 52 of the stepped bore 34, as shown in FIG. 5, in the absence of opposing external forces.

Once the fastener has been coupled to the first structural member 32, the first structural member 32 can be shipped or otherwise transported for later attachment to the second structural member 36.

Referring to FIGS. 5, 6, and 7, various methods of attaching the first structural member 32 to the second structural member are demonstrated. Referring specifically to FIG. 5, the first structural member 32 is positioned in close proximity to the second structural member 36 such that the distal portion of the fastener shank 42 is at the mouth 66 of the corresponding bore 38. The resilient retainer 10 holds the fastener shank 42 along the central axis 52 of the stepped bore 34 which overlaps the central axis 54 of the corresponding bore 38. Since axial alignment exists absent opposing external forces, the fastener shank 42 may be advanced directly along the central axis 54 manually or with a fastening tool 72 whereby the fastener shank 42 is threaded into the corresponding bore 38 to secure the first and second structural members 32 and 36 together.

Referring to FIG. 6, a first structural member 32 containing a pre-attached fastener is aligned with a second structural member such that a stepped bore 34 and a through hole 35 overlap, but are offset. The fastener shank 22 can be tilted off the central axis of the stepped bore 52 via a lateral force applied on the fastener head 40 by hand or with a fastening tool 72 whereby the fastener shank 42 can pass through the offset hole 35. A nut 37 is thereafter threaded onto the fastener, thus securing the first structural member 32 to the second structural member 36'.

As shown in FIG. 7, the retainer will also provide for fastener alignment where the central axis 60 of the corresponding bore 38 and the central axis 52 of the stepped bore 34 are parallel but non-coincident. The structural members 32 and 36 are again brought together such that the bore 34 and corresponding bore 38 overlap. The fastening tool 72 is then used to apply a lateral force on the fastener head 40, whereby the fastener shank 42 is tilted off the central bore axis 34 and the tip of the fastener shank 42 is introduced into and engaged with the mouth 70 of the corresponding bore 38. The fastening tool 72 is then used shift the fastener head 40 such that the fastener shank 42 is aligned with central axis 60 of the corresponding bore 38. The net effect of the aforementioned process is that the fastener 28 is shifted laterally within the bore 34 and thereby aligned with the parallel but non-coincident corresponding bore axis 60. The fastener shank 42 is then threadably advanced into the corresponding bore 38 with the fastening tool 72 in order to complete the assembly 62.

So, while it is preferable under most circumstances that the central axis 52 of the stepped bore 34 and the central axis 54 of the corresponding bore 38 are in axial alignment, the present invention permits the fastener 28 to be shifted and/or tilted within the bore 34 to achieve alignment with improperly aligned corresponding bores.

It should also be understood by those skilled in the art that the fastener 28 and corresponding bore 38 need not be threaded. Other types of fasteners such as rivets, studs, and pins are contemplated and are considered to be within the scope of the present invention.

The foregoing discussion discloses and describes a merely exemplary embodiment of the present invention. One skilled in the art will readily recognize in such discussion and from the accompanying drawings and claims that various changes, modifications and variations can be made therein without departing from the spirit and scope of the invention as defined in the following claims.

What is claimed is:

1. A flexible retaining apparatus at least partially disposable within a bore for receiving a fastener having a head and an extending shank, said bore having a central axis and a diameter which is larger than the diameter of said extending shank, said retaining apparatus comprising:

an annular, unitary body made of a resilient plastic material and having an aperture therethrough;

wherein said annular body includes a plurality of resilient selectively deformable radially outwardly extending arcuate convex projections, the outermost portions of which seat substantially contiguously against the inner wall of the axial bore upon insertion and demark an outer diameter larger than the diameter of the bore, and furthermore includes a plurality of resilient selectively deformable radially inwardly extending and substantially concaved arcuate projections, the innermost portions of which demark an inner diameter smaller than the outer diameter of the extending fastener shank, said innermost portions being contacted by the shank of the fastener upon insertion into said aperture;

whereby upon insertion of the retaining apparatus into the bore the outward projections deform, tending to secure the retaining apparatus within the bore; and whereby upon insertion of the shank within the aperture of the retaining apparatus further deformation of the retaining apparatus occurs such that the outward and inward projections in cooperation tend to maintain the shank along the central axis of the bore absent opposing external forces; and wherein the annular body is of sufficient longitudinal length to provide the longitudinal dispersion of projections necessary to maintain the fastener shank along the central bore axis absent opposing external forces.

2. The retaining apparatus of claim 1 wherein said annular body is entirely defined by said inward and outward projections.

3. The retaining apparatus of claim 2 wherein said outward projections are symmetrically spaced apart by said inward projections.

4. The retaining apparatus of claim 2, wherein the outward and inward projections extend longitudinally along the annular body.

5. The retaining apparatus of claim 1, wherein said annular body is thin-walled and made of a polymeric material.

6. A resilient retainer for receiving the shank of a fastener, said retainer being at least partially disposed within a bore having a central axis wherein the bore has a diameter substantially larger than the diameter of the shank, thus allowing for insertion of said fastener shank at various angles relative to the central axis of the bore and translation of said fastener shank within the bore, said retainer comprising:

a convoluted, unitary, thin-walled annular body made of a polymeric material and having an aperture therethrough;

wherein said annular body is defined in part by a plurality of resilient polymeric ear portions having a given wall thickness projecting radially outwardly which extend longitudinally along the annular body, the outermost portions of said ear portions demarking an outer diameter slightly larger than the bore, whereby upon insertion of the retainer into the bore at least a plurality of the ear portions deform, tending to maintain the retainer within the bore;

wherein said annular body is furthermore defined by a plurality of resilient ribs having a smaller wall thickness projecting radially inwardly which extend longitudinally along the annular body, the innermost portion of said ribs demarking an inner diameter slightly smaller than the outer diameter of the fastener shank, whereby upon insertion of the shank into the aperture of the retainer further deformation occurs and the ear portions and ribs in cooperation tend to maintain the shank along the central axis of the bore absent opposing external forces;

wherein said retainer has a longitudinal length and stiffness sufficient to successfully maintain the fastener along the central bore axis absent opposing external forces; and wherein said longitudinally extending ear portions and ribs are alternately and symmetrically spaced and have sufficient circumferential spacing to permit [to align] the fastener *to align* with a bore in a second structural member *by allowing* lateral movement of the fastener shank within the axial bore.

7. A method of attaching at least one fastener having an extending shank to a first structural member, said structural member including a bore for receiving the fastener shank, said bore including a central axis and a diameter which is substantially larger than the diameter of the shank, said method comprising the steps of:

inserting a retaining apparatus having a plurality of resilient radially outwardly extending projections the outermost portions of which define an outer diameter, a plurality of resilient radially inwardly extending projections the innermost portions of which define an inner diameter, and an aperture therethrough into the bore such that the outer diameter of the retaining apparatus seats against a wall of the bore;

inserting the shank of said at least one fastener at least partially through said aperture such that the shank engages the innermost surface of the retaining apparatus;

whereby the inward and outward projections cooperate to maintain the fastener shank along the central axis of the bore absent an opposing external force;

aligning the first structural member with a second structural member such that a number of bores contained on the first structural member overlap a number of corresponding bores contained on said second structural member; and further inserting said at least one fastener into the corresponding bore contained on that second structural member, and manipulating the shank of the fastener away from the central axis of the bore contained on the first structural member thereby aligning the fastener shank with a non-coincident central axis of the corresponding bore.

8. The method of claim 7, wherein the step of manipulating the fastener includes the step of applying an external lateral force to the head of the fastener.

*9. In combination a flexible retaining apparatus and fastener, said flexible retaining apparatus being at least partially disposable within a bore for supporting said fastener, said bore having a central axis and a diameter which is larger than a diameter of an extending shank of said fastener, said combination comprising:*

*said fastener having a head portion and an extending shank; and*

*said flexible retaining apparatus having an annular, unitary body made of a resilient plastic material and having an aperture therethrough;*

*wherein said annular body includes a plurality of resilient selectively deformable radially outwardly extending arcuate convex projections, the outermost portions of which seat substantially contiguously against the inner wall of the axial bore upon insertion and demark an outer diameter larger than the diameter of the bore, and furthermore includes a plurality of resilient selectively deformable radially inwardly extending and substantially concaved arcuate projections, the innermost portions of which demark an inner diameter smaller than the outer diameter of the extending fastener shank, said innermost portions being contacted by the shank of the fastener upon insertion into said aperture;*

*whereby upon insertion of the retaining apparatus into the bore the outward projections deform, tending to secure the retaining apparatus within the bore; and*

*whereby upon insertion of the shank within the aperture of the retaining apparatus deformation of the retaining apparatus occurs such that the outward and inward projections in cooperation tend to maintain the shank along the central axis of the retaining apparatus absent opposing external forces; and*

*wherein the annular body is of sufficient longitudinal length to provide the longitudinal dispersion of projections necessary to maintain the fastener shank along the central bore axis absent opposing external forces.*

*10. A fastener and retainer assembly for at least partial insertion within a bore, said assembly comprising:*

*a fastener including a head and a shank portion; and*

*a retainer including a convoluted, unitary, thin-walled annular body made of a polymeric material and having an aperture therethrough;*

*wherein said annular body is defined in part by a plurality of resilient polymeric ear portions having a given wall thickness projecting radially outwardly which extend longitudinally along the annular body, the outermost portions of said ear portions demarking an outer diameter slightly larger than the bore, whereby upon insertion of the retainer into the bore at least a plurality of the ear portions deform, tending to maintain the retainer within the bore;*

*wherein said annular body is furthermore defined by a plurality of resilient ribs having a smaller wall thickness projecting radially inwardly which extend longi-*

*tudinally along the annular body, the innermost portion of said ribs demarking an inner diameter slightly smaller than the outer diameter of the fastener shank, whereby upon insertion of the shank into the aperture of the retainer deformation occurs and the ear portions and ribs in cooperation tend to maintain the shank along the central axis of the retainer absent opposing external forces;*

*wherein said retainer has a longitudinal length and stiffness sufficient to successfully maintain the fastener along the central bore axis absent opposing external forces; and*

*wherein said longitudinally extending ear portions and ribs are alternately and symmetrically spaced and have sufficient circumferential spacing to permit the fastener to align with a bore in a second structural member by allowing lateral movement of the fastener shank within the axial bore.*

*11. The method according to claim 7, wherein said step of inserting said retaining apparatus into the bore precedes said step of inserting the shank of said fastener through an aperture in said retaining apparatus.*

*12. A fastener and flexible retaining apparatus assembly, said assembly being at least partially disposable within a bore having an inner wall with a central axis and a given diameter, said assembly comprising:*

*a fastener having a head portion and an extending shank; and*

*a flexible retaining apparatus having an annular, unitary body made of a resilient plastic material and having an aperture therethrough, said annular body including a plurality of resilient selectively deformable radially outwardly extending arcuate convex projections, the outermost portions of which seat substantially contiguously against the inner wall of the bore upon insertion and demark an outer diameter larger than the diameter of the bore, said body further including a plurality of resilient selectively deformable radially inwardly extending and substantially concaved arcuate projections, the innermost portions of which demark an inner diameter smaller than an outer diameter of the fastener shank, said innermost portions being contacted by the shank of the fastener upon insertion into said flexible retaining apparatus;*

*whereby upon insertion of the shank within the aperture of the retaining apparatus deformation of the retaining apparatus occurs such that the inward projections tend to maintain the shank along the central axis of the retaining apparatus absent opposing external forces;*

*whereby upon insertion of the retaining apparatus into the bore the outward projections deform, tending to secure the retaining apparatus within the bore; and*

*wherein the annular body is of sufficient longitudinal length to provide the longitudinal dispersion of projections necessary to maintain the fastener shank along the central bore axis absent opposing external forces.*

* * * * *